United States Patent
Price et al.

(10) Patent No.: US 9,230,131 B2
(45) Date of Patent: *Jan. 5, 2016

(54) RULE-BASED ACCESS CONTROL LIST MANAGEMENT

(71) Applicant: International Business Machines Corporation, Armonk, NY (US)

(72) Inventors: Jeffrey K. Price, Austin, TX (US); Prabhat K. Sur, Austin, TX (US); Robert R. Wentworth, Round Rock, TX (US); Stanley C. Wood, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,690

(22) Filed: Feb. 12, 2015

(65) Prior Publication Data

US 2015/0161412 A1   Jun. 11, 2015

Related U.S. Application Data

(63) Continuation of application No. 13/419,517, filed on Mar. 14, 2012, now Pat. No. 9,002,890.

(51) Int. Cl.
*G06F 21/62* (2013.01)

(52) U.S. Cl.
CPC ........ *G06F 21/6218* (2013.01); *G06F 21/6209* (2013.01)

(58) Field of Classification Search
CPC .................................................. G06F 21/6209
See application file for complete search history.

(56) References Cited

U.S. PATENT DOCUMENTS

| | | | |
|---|---|---|---|
| 6,219,706 B1 | 4/2001 | Fan et al. | |
| 8,336,096 B2 | 12/2012 | Narusawa et al. | |
| 8,484,355 B1 * | 7/2013 | Lochhead et al. | 709/226 |
| 2003/0140243 A1 | 7/2003 | Nusser et al. | |
| 2005/0210263 A1 * | 9/2005 | Levas et al. | 713/182 |
| 2006/0182055 A1 | 8/2006 | Coffee et al. | |
| 2008/0139167 A1 * | 6/2008 | Burgess | 455/404.1 |
| 2009/0007229 A1 | 1/2009 | Stokes | |
| 2009/0154348 A1 | 6/2009 | Newman | |
| 2009/0276840 A1 * | 11/2009 | Cao et al. | 726/9 |

(Continued)

OTHER PUBLICATIONS

Cisco Systems, Inc., Network Admission Control, 2006, pp. 1-49.

(Continued)

*Primary Examiner* — Neveen Abel Jalil
*Assistant Examiner* — Matthew Ellis
(74) *Attorney, Agent, or Firm* — Patrick J. Daugherty; Driggs, Hogg, Daugherty & Del Zoppo Co., LPA

(57) ABSTRACT

Access control list entries are managed as a function of access control list entry metadata for the object and the requesting user, and of an access control list rule applicable to the requesting user and the requested object. The access control list entry metadata for the object and the user is updated in response to request authorizations and denials. The access control list entry metadata for the object and the user is linked to the object and the user. Updating of the access control list entry metadata for the object and the user does not overwrite metadata for another access control list entry that is associated with the object and with another user that is different from the user.

20 Claims, 3 Drawing Sheets

(56) References Cited

U.S. PATENT DOCUMENTS

| | | | |
|---|---|---|---|
| 2010/0125605 A1 | 5/2010 | Nair et al. | |
| 2010/0169392 A1 | 7/2010 | Lev Ran et al. | |
| 2010/0228799 A1 | 9/2010 | Hutton et al. | |
| 2012/0089410 A1 | 4/2012 | Mikurak | |
| 2012/0110646 A1 | 5/2012 | Ajitomi et al. | |
| 2012/0266073 A1* | 10/2012 | Tanaka et al. | 715/736 |
| 2013/0073854 A1* | 3/2013 | Patti et al. | 713/171 |

OTHER PUBLICATIONS

Bacon, "A Model of Oasis Role-Based Access Control and Its Support for Active Security", University of Cambridge, 2002, pp. 495-497, 509, 515, 528, 535.

U.S. Appl. No. 13/419,517, filed Mar. 14, 2012.

Notice of Allowance (Mail Date Nov. 25, 2014) for U.S. Appl. No. 13/419,517, filed Mar. 14, 2012.

* cited by examiner

RULE-BASED ACCESS CONTROL LIST MANAGEMENT

BACKGROUND

Embodiments of the present invention relate to the management of file systems via the use of Access Control List (ACL) systems and methods.

Access Control Lists are file system constructs used to grant users, groups or other entities access to file system objects (files, directories, etc.) within a file system. Once such ACL's are created, the entities generally retain access to the various file system objects until the granted privileges are removed by an administrator or owner of the file system object. Effective management of the file system may require an administrator or object owner to periodically evaluate the permissions that are granted and remove those that are no longer warranted or needed, for example in order to prevent the ACL from growing needlessly large and presenting burdens or problems with respect to efficient file system management. Removing stale or obsolete ACL permissions may also be advised to avoid security problems or other exposures presented by maintaining permissions of entities that actually should no longer have access to the file system object. Such conventional management processes may be time consuming and cumbersome to effect, or expensive in terms of system resources.

BRIEF SUMMARY

In one embodiment of the present invention, a method for managing access control list entries as a function of user-specific object access data includes determining whether a request is authorized for access to an object, wherein the request is by a user having an access control list entry. The determination is a function of access control list entry metadata for the object and the requesting user that is stored in an access control list metadata, and of an access control list rule applicable to the requesting user and the requested object that is stored in an access control list rule store. If determined that the request is not authorized for access to the object, access is denied and the access control list entry metadata for the object and the user updating to indicate the denial. Else, if determined that the request is authorized, access for the user to the object is granted, and the access control list entry metadata for the object and the user updated to indicate the granted access. More particularly, the access control list entry metadata for the object and the user is linked to the object and the user, and updating the access control list entry metadata comprehends entering a time and date of the request input as a last object access metadata entry, revising a count of accesses of the object by the user, or invalidating the user access control list entry. Moreover, updating of the access control list entry metadata for the object and the user does not overwrite metadata for another access control list entry that is associated with the object and with another user that is different from the user.

In another embodiment, a system has a processing unit, computer readable memory and a tangible computer-readable storage device with program instructions, wherein the processing unit, when executing the stored program instructions, determines whether a request is authorized for access to an object, wherein the request is by a user having an access control list entry. The determination is a function of access control list entry metadata for the object and the requesting user that is stored in an access control list metadata, and of an access control list rule applicable to the requesting user and the requested object that is stored in an access control list rule store. If determined that the request is not authorized for access to the object, access is denied and the access control list entry metadata for the object and the user updated to indicate the denial. Else, if determined that the request is authorized, access for the user to the object is granted, and the access control list entry metadata for the object and the user updated to indicate the granted access. The access control list entry metadata for the object and the user is linked to the object and the user, and updating the access control list entry metadata comprehends entering a time and date of the request input as a last object access metadata entry, revising a count of accesses of the object by the user, or invalidating the user access control list entry. Updating of the access control list entry metadata for the object and the user does not overwrite metadata for another access control list entry that is associated with the object and with another user that is different from the user.

In another embodiment, an article of manufacture has a computer-readable storage medium with computer readable program code embodied therewith, the computer readable program code comprising instructions that, when executed by a computer processing unit, cause the computer processing unit to determine whether a request is authorized for access to an object, wherein the request is by a user having an access control list entry. The determination is a function of access control list entry metadata for the object and the requesting user that is stored in an access control list metadata, and of an access control list rule applicable to the requesting user and the requested object that is stored in an access control list rule store. If determined that the request is not authorized for access to the object, access is denied and the access control list entry metadata for the object and the user updated to indicate the denial. Else, if determined that the request is authorized, access for the user to the object is granted, and the access control list entry metadata for the object and the user updated to indicate the granted access. The access control list entry metadata for the object and the user is linked to the object and the user, and updating the access control list entry metadata comprehends entering a time and date of the request input as a last object access metadata entry, revising a count of accesses of the object by the user, or invalidating the user access control list entry. Updating of the access control list entry metadata for the object and the user does not overwrite metadata for another access control list entry that is associated with the object and with another user that is different from the user.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
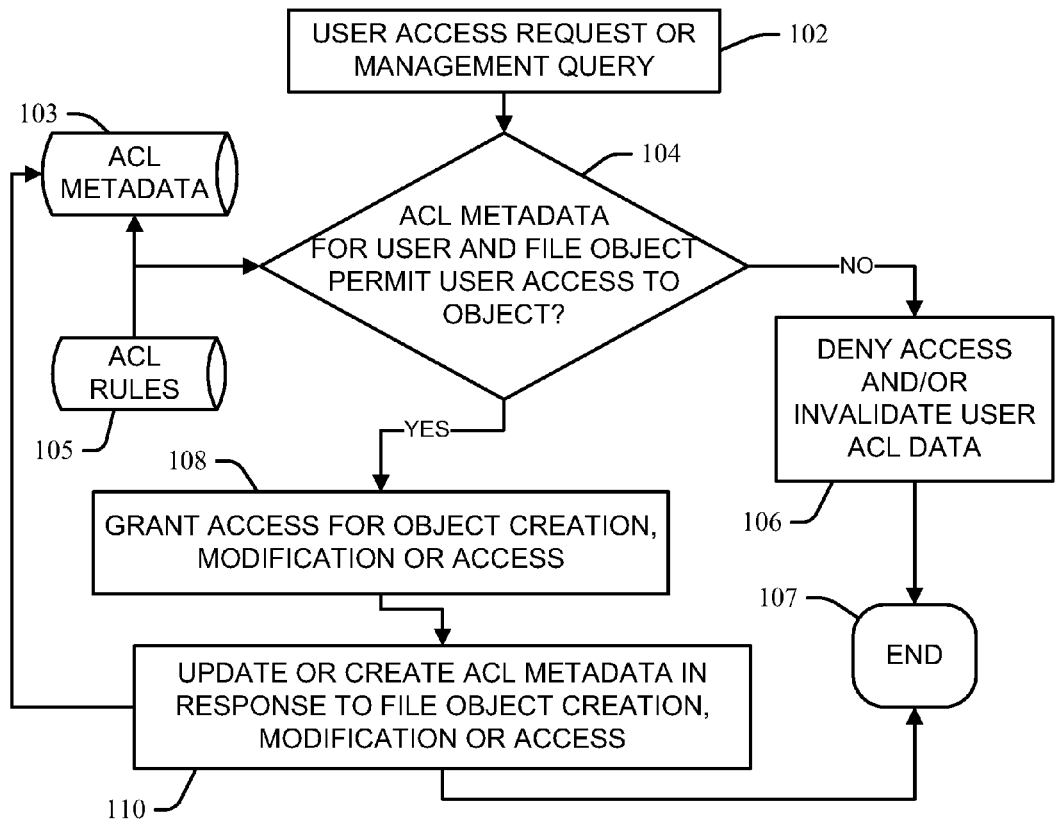
FIG. 1 is a block diagram illustration of an embodiment of the present invention that creates and manages file system ACL metadata tied to a particular ACL entry of a file system object and unique to user access activities.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates an embodiment of the present invention that accesses, creates, modifies or otherwise manages file system ACL metadata tied to a particular ACL entry of a file system object in response to an access request by a user who is authorized by the ACL metadata, and wherein the metadata modified or created is also unique to the user. The embodiment manages ACL entries as a function of user-specific object access data. More particularly, in response to a request at 102 associated with a request by a specific user having an access control list entry to access a specific file system object, a processing unit executing program code performs file system management processes with respect to the file system data object and the user by determining at 104 whether this specific request by this specific user is authorized for access to the object as a function of ACL metadata for the object and the requesting user that is stored in an ACL metadata store 103, in view of one or more rules in an ACL access rule store 105 that are applicable to the requesting user and the requested object.

If not, at 106 a denial of access condition is invoked for the user as a function of the ACL rules 105. This may comprise denying access for the user for this request but maintaining validity of the ACL entry for the user for future requests for this or other objects; and/or it may comprise invalidating the user entry in the ACL for all future access requests. The process ends at 107 after the denial/invalidation of access at 106.

Otherwise, the user is granted access to the data object at 108 for modification, and/or for the creation of a new object. At 110 ACL metadata for the object modified or created and the requesting user entry is updated or created in ACL metadata store 103 as a function of the object access or creation at 108, which comprises at least one of a time and date of last object access, modification or creation by the user, and an increment of a count of accesses of the object by the user. After the ACL metadata 103 is updated, the process ends at 107.

Prior art ACL file systems typically store dates and times related to when a file system object was created (ctime), when it was last accessed (atime) and when the object was last modified (mtime). These entries are stored and tracked at the object level but they are not tied to the entity that accessed or modified the object, and thus are not linked or associated to any particular user responsible for the request resulting in the saved (last) access/modification time. There are times when file system object owners need to track who has accessed the objects and manage the ACL's related to those objects. Being able to identify when the entities have last accessed or modified the objects allows the owners to better manage the objects and the ACL's associated with those objects. The current atime and mtime values saved to object metadata in conventional ACL processes do not provide a connection to individual users that enable the ACL data to distinguish and manage the ACL permissions of individual users sharing permitted access to the object.

In contrast, the metadata considered at 104 or created/updated at 110 is not global ACL data generic to all authorized users, but comprises multiple access (atime) or modification (mtime) data entries or other data indicative of the temporal event of the object access at 108 that are each tied to the unique requesting user entries in the ACL. Multiple accesses by different users in the present embodiment of FIG. 1 do not overwrite each other and result in only one, most-recent access (atime) or modification (mtime) time and date saved to the object metadata. Instead, embodiments of the present invention extend the Access Control List capabilities within the file system ACL to allow capturing and storing the last access time, modification time and/or access event count data for each entry within the ACL by adding a date/timestamp field for access and/or modification times to each entry within the ACL and modifying the file system operating system to update these new fields. Thus, at 110 the access metadata attributes are saved for every object uniquely for each different user, and also kept up to date in response to later accesses by the same user, resulting in a plurality of data entries indicative of individual access and modification times that are each tied to the different ACL entries.

The present embodiment enables an administrator or object owner to have a better understanding of who is using the object, when they used it, how they used it, along with allowing the owner to better control the ACL entries by knowing which ones are not being used, and if used by whom. Thus, the process may also be instigated at 102 by a management query prompt independent of a request by the user, wherein a system administrator may intentionally query as to a user's status with regard to the object, for example on a routine or periodic basis, thereby pruning the ACL data at 106.

Embodiments of the present invention may use the saved ACL metadata 103 to identify and remove ACL entries that are not being utilized, as well as to differentiate accesses permitted at 104 by the ACL rules 105 for different users. Accordingly, a first user having the same general ACL permissions as a second user (for example, two members of a same user class given access by the ACL rules 105 based upon their common class status) may still be denied access to the object at 104 from another ACL rule stored at 105 based on metadata reflecting prior access data relative to the object that is different from prior access metadata saved with respect to the second user.

Figure 2:
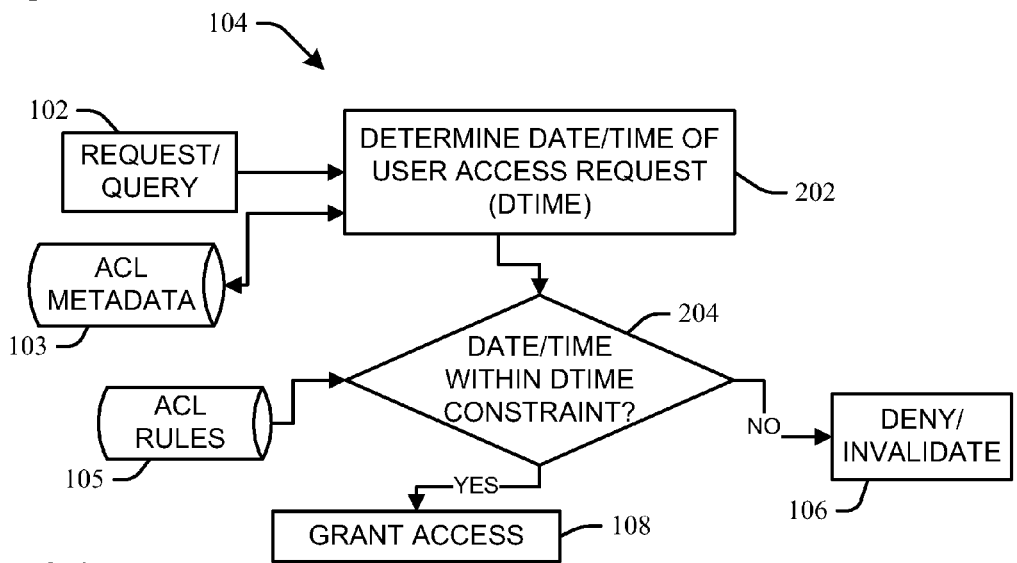
FIG. 2 is a block diagram illustration of an embodiment of the present invention that manages user object access as a function of time duration constraints for the user ACL entry.

FIG. 2 illustrates one example wherein ACL rule permissions stored at 105 are effective only during a specified time period controlled by time duration constraints for each user entry in the ACL 103. There are times when ACL management requires that access be granted to a user or group or other entity, but wherein the access is only needed for a specific time period or duration. Prior art ACL management does not provide for any systematic solution related to time based restrictions for user access, but instead administrators may only control access by specifically granting or removing access for a user or group of users. It then becomes the administrator's responsibility to evaluate and monitor the ACL's over time to control the authorization of an entity to access an object. Often the prior art ACL unintentionally allows users and groups to retain access to file system objects even when the access is no longer needed. This may result in potential security exposures, licensure, and/or data currency issues accessing objects over time.

In contrast, in the embodiment of FIG. 2, the determination of access for a given user (at 104 of FIG. 1) comprises application of specific duration constraints assigned by the ACL rules 105 relating to the validity of a user ACL entry, wherein any access request at 102 having a date or time outside of the duration constraint results in a denial of access condition. This embodiment extends the Access Control List capabilities within the file system to allow an administrator or other user who owns the requested file system object or is otherwise granted control of the object to specify a duration constraint metadata (dtime) when creating or modifying ACL's. In one example, the dtime metadata specifies a "Begin Date/Time" field that specifies a date and time on which access to the object begins, and an "End Date/Time" field that specifies the ending date and time for the granted access. Thus, the date and time of the current access request 102 is determined at 202, and at 204 an access control evaluation process determines whether the date and time of the user request 102 satisfies the duration constraint by falling within said dtime begin and end date/times. If so, access may be granted at 108; otherwise access is denied and/or invalidated at 106.

The embodiment of FIG. 2 improves the security stance related to file system accessibility while also increasing management flexibility in determining when the object itself can be accessed. The embodiment helps to reduce potential security exposures and increase operational efficiencies by allowing the administrators to constrain access for any specific user to a specific, time based, duration when the ACL is being created or modified, rather then relying on manual intervention as required under the prior art. The ACL permissions may also be proactively pruned, for example by routinely or periodically instigating the process at 102 via a management query and thereby identifying and invalidating ACL permissions at 106 when the dtime data indicates that the user ACL permissions no longer meet the duration rule.

Figure 3:
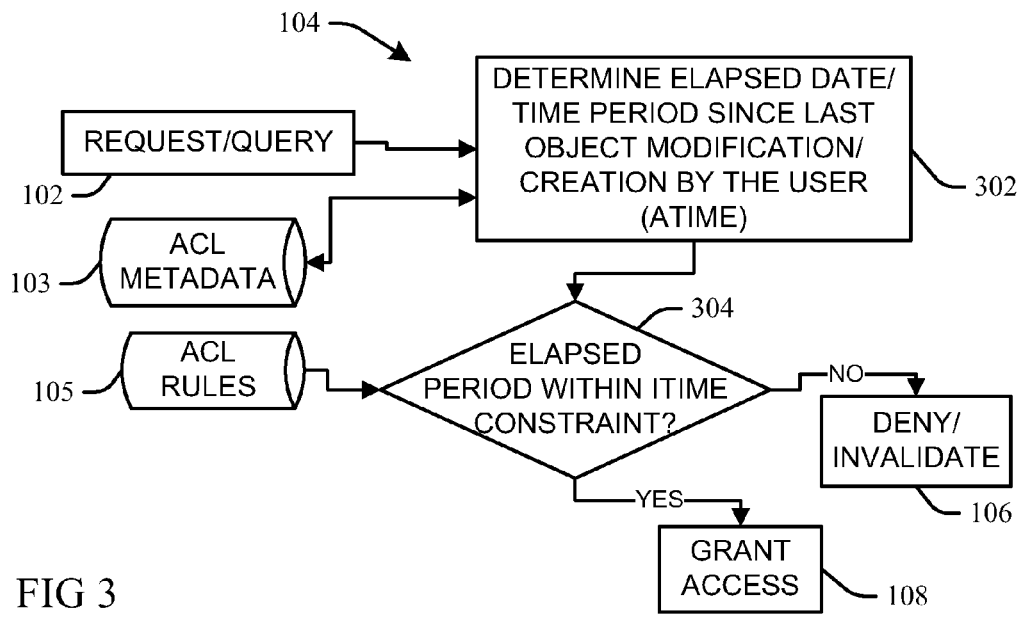
FIG. 3 is a block diagram illustration of an embodiment of the present invention that manages user object access as a function of user ACL entry inactivity.

FIG. 3 illustrates another example wherein ACL rule permissions stored at 105 for a given user ACL specify an inactivity time period (itime) that provides for the expiration of an ACL entry after an elapsed inactivity time period from a last access time of the accessing entity via the ACL entry, thus providing an automated method to remove an ACL entry after a period of non-use or inactivity. In this embodiment, the determination of access for a given user (at 104 of FIG. 1) further comprises determining at 302 an elapsed time period since a last modification, access, or creation of the requested object by the requesting user via the ACL entry reflected by the access time field (atime) within the object metadata. The atime data time is updated (for example, overwritten) each time the user creates, accesses or modifies the object at each previous access granted via the ACL entry at 108. At 304 the elapsed time period (the time period determined as lapsed from the atime data to the current request time) is compared to an inactivity time period (itime) specified in the ACL rules 105 relating to the requested access at 102 of this object and/or validity of the user ACL entry, and access granted at 108 if the elapsed time does not exceed the itime value, or denied and/or invalidated at 106 if it does exceed the itime value.

Access Control Lists may become large over time due to the fact that entries are often added but rarely removed or cleaned up. It generally falls to an object owner's responsibility to periodically evaluate the permissions granted and remove those that are no longer needed. Often accessing entities change roles yet retain access rights under prior art systems and methods well after they were required. The embodiment of FIG. 3 provides an automated method to remove an ACL entry after a period of non-use or inactivity determined via application of the inactivity period (itime) to the elapsed time since the last object access indicated by the atime metadata, extending Access Control List capabilities within a file system to allow administrators (for example, users who own a file system object, or have been granted control of the object) to specify the inactivity period (itime) value or expiration rules/constraints used to apply the value when creating or modifying ACL's. At 110 (FIG. 1) the embodiment stores or updates the atime attribute with the last access time by the requesting user, or class or group of users applicable to the user, and requires the Access Control Evaluation process at 304 to examine the current atime attribute of the ACL entry to determine that the user should have access to the requested object if the current itime attribute satisfies an inactivity rule of being within the itime constraint period since the last access date/time stored within the ACL.

Thus, an inactivity rule stored with the ACL rules 105 specifies a period of time (itime) for which non-use of the object by the user results at 304 in the ACL entry being automatically invalidated or removed from the system at 106. As an example, if a user has not used a file for time period larger than the specified time period, it may be assumed that the user probably does not need the access anymore, and the ACL entry may either become invalid or removed at 106.

The embodiment also provides an outbound method that evaluates ACL's at 304 and removes or invalidate an entry at 106 in response to maintenance prompt (for example, a periodic test input) at 102. Thus, if the last access date/time stored in the atime data is older than the defined inactivity rule stored within the ACL, security exposures may be reduced and operational efficiencies increased by allowing the administrators to constrain the access when the ACL is being created or modified, rather than relying on some subsequent, future manual intervention.

Figure 4:
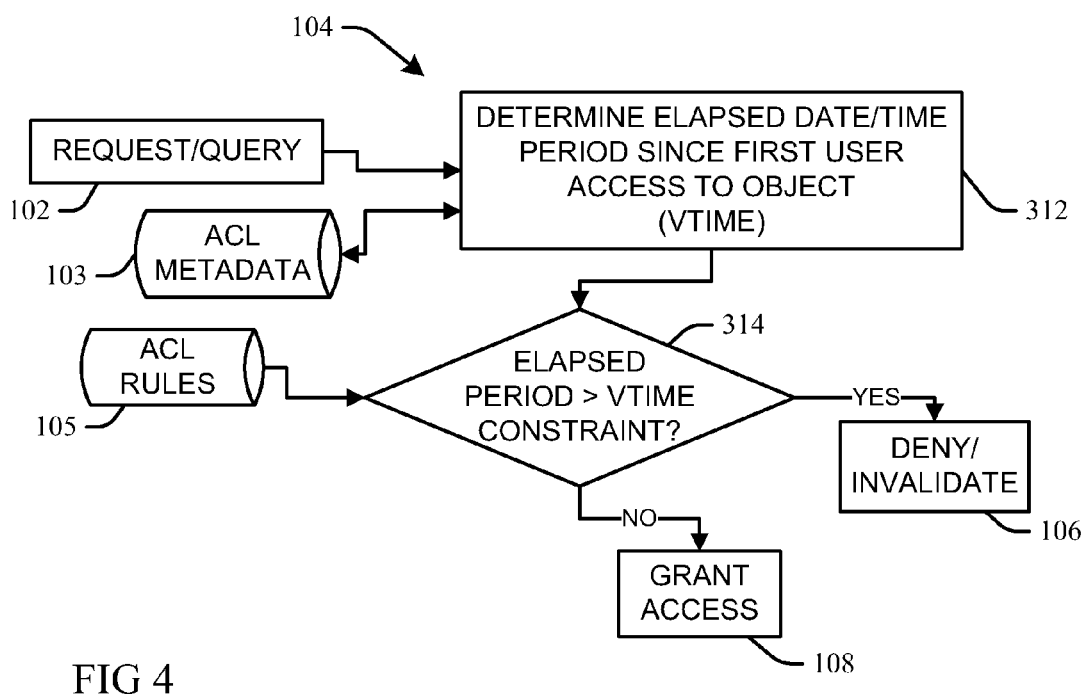
FIG. 4 is a block diagram illustration of an embodiment of the present invention that manages user object access as a function of validity time periods applied to the user ACL entry.

FIG. 4 illustrates another embodiment wherein a validity period is determined as a function of a specific length of time after a first access time indicated by a valid time (vtime) metadata entry, wherein at 314, regardless of any subsequent access times (such as those indicated by an ACL atime entry), the ACL entry is only valid for a specific length of time after the first access time indicated by the vtime data at 312. The vtime attribute is set when the ACL entry is created, and a valid time rule provided by the ACL rules 105 specifies a length of time that the ACL entry will be valid after a first access has been granted to the user.

In some embodiments, the vtime determination process is part of or an extension to the dtime process of FIG. 2 or the itime process of FIG. 3 discussed above. For example, the vtime attribute may be set when the ACL entry is created as to specify the length of time the ACL entry will be valid once the first access has been granted. On a first access or positive evaluation of the ACL entry, an initial access time/date metadata entry atime (which is initialized as unset or zero) is updated to reflect the time/date of this first access, this updated/set value used to defined the "Begin Date/Time" field of the dtime or itime metadata. The "End Date/Time" field or similar of the dtime and itime metadata may then be determined by adding the vtime field data to the "Begin Date/Time" field (atime+vtime), the vtime thus used to define the dtime or itime periods applied in FIG. 2 or 3. This example basically piggy-backs on the duration based ACL entries provided in the embodiments of FIGS. 2 and 3.

Figure 5:
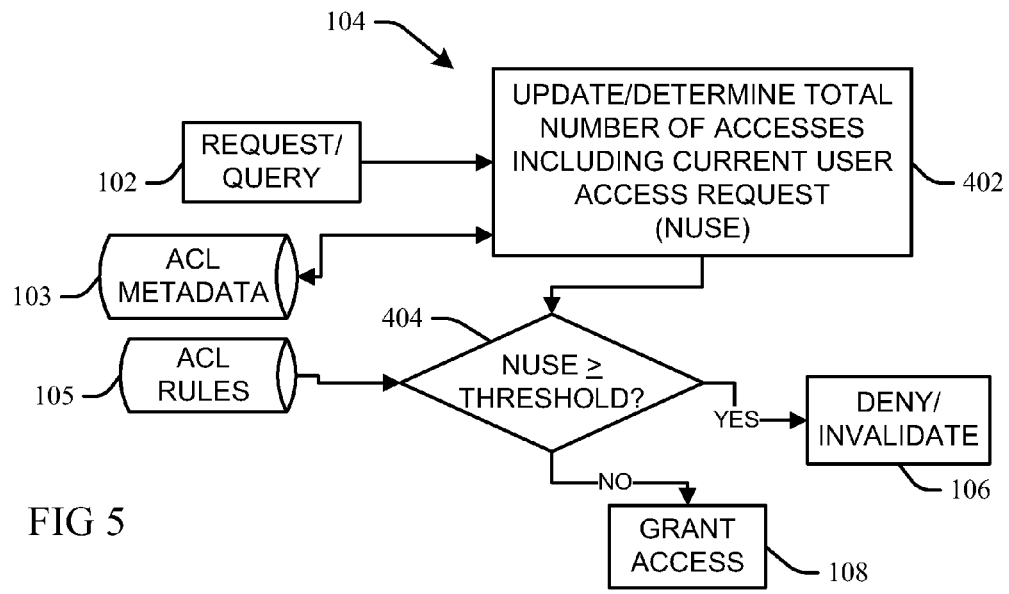
FIG. 5 is a block diagram illustration of an embodiment of the present invention that manages user object access as a function of a number of accesses permitted for the user ACL entry.

FIG. 5 illustrates an embodiment of the present invention that manages ACL entries and object accesses (at 104 of FIG. 1) as a function of a number of accesses permitted for a given user. Thus, at 402 the process determines a total number of accesses of the object by this user reflected in a use count metadata (nuse), including a present access request at 102 (which may result in an increment of a nuse data count); or in response to a management query at 102, such as periodic housekeeping inquiry. At 404 the nuse data is compared to threshold applicable to this user provided by the ACL rules 105, and access granted at 108 if the nuse meets (for example, does not exceed or equal) the threshold; else, access is denied and/or user ACL invalidated at 106.

For example, there are times when the owner of a file system object needs to grant access to an entity but for security reasons would like the access to be an ephemeral one, a single, secure, usage of the object. Thus, the threshold may be set to one, wherein only one, single access to the object is granted 404-108 (when the nuse is still in an initialized zero or unset state), and any subsequent access denied or invalidated at 404-106. Any management inquiry at 102 after the single access has been made and the nuse value is one or otherwise flags that the object has been accessed may thus invalidate the ACL entry at 106, thereby reducing the extant ACL entry permissions. It will be appreciated that any binary value indicator (for example, ON/OFF, TRUE/FALSE, a one-time use flag, etc.) may be used for the nuse metadata in single-use embodiments, with no need to increment a count over one but wherein the value of the nuse indicator is merely switched between accessed and non-accessed values.

Multiple accesses may also be authorized by the threshold, wherein the threshold is greater than one, and each access by the user at 102 increments a count of accesses in the nuse metadata. Alternate embodiments may also initialize the nuse metadata for a user with a specific number of permitted accesses, wherein each access decrements this value in the nuse data and access is granted at 404-108 for each such request until the nuse attribute goes to zero. In this example, the threshold is zero, and the nuse value must be greater than the zero-threshold at 404 to grant access at 108. In this decrementing process example, a single-access permission may be achieved by initializing the nuse value as one.

The access-count nuse metadata may also be used to set or trigger user-specified time limits or values via the dtime, itime and vtime processes described above with respect to FIGS. 2, 3 and 4. For example, the date and time of the access request 102 that results in an nuse count of total accesses by the user meeting a threshold condition at 404 may be used as the "Begin Date/Time" field data in the dtime process of FIG. 2, or as the "End Date/Time" field data in the case of a single-use setting. Similarly, it may be used to start an inactivity time period or timer used with the itime metadata, or a validity time period or timer used with the vtime metadata, or to signal the end of the inactivity or validity time periods/timers in the single-use setting embodiments.

More particularly, it will be appreciated that each of the embodiments of FIGS. 2, 3, 4 and 5 may independently determine access permissions, they may be used in combination, or they may be used as condition precedents to trigger others of the processes or set their respective values. For example, they may also be used in combination at 104 of FIG. 1 wherein two or more of the processes 204, 304, 314 and 404 must indicate access should be granted to trigger access at 108, or to indicate access should be denied to deny access or invalidate a user's ACL at 106, as specified by the ACL rules 105.

It will also be appreciated that the ACL for a file or directory can contain many entries giving different entities (people, group, other) particular access rights to the file or directory. Further, the term "user" as used in describing access to an object via an ACL entry as described above is not limited to permissions for a single entity, but may refer to any group or other generic entity class comprising pluralities of entities that are each granted rights to the file system objet via an ACL user entry. The embodiments of the present invention discussed above are applicable to ACL attributes and rules that are tied to the ACL entry themselves, and not to the ACL as a whole.

Figure 6:
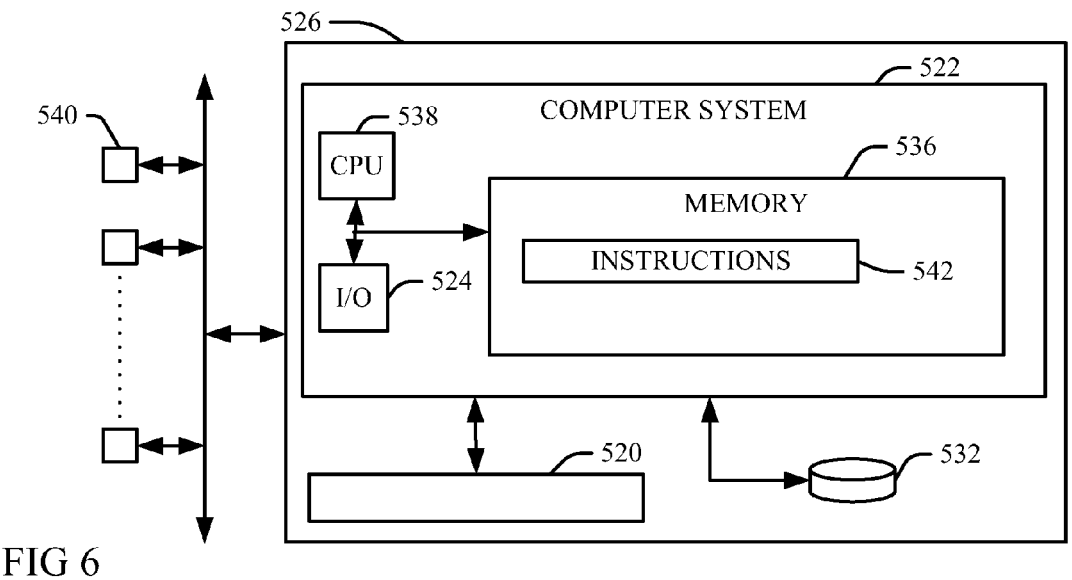
FIG. 6 is a block diagram illustration of a computerized implementation of an embodiment of the present invention.

Referring now to FIG. 6, an exemplary computerized implementation of an embodiment of the present invention includes a computer system or other programmable device 522 in communication with network data sources 540 for managing user object access as a function of metadata specific to the object and to the user ACL entry. Instructions 542 reside within computer readable code in a computer readable memory 536, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to manage user object access as a function of metadata specific to the object and to the user ACL entry as described above with respect to FIGS. 1-5.

Embodiments of the present invention may also perform process steps of the invention on a subscription, advertising, and/or fee basis. That is, a service provider could offer to integrate computer-readable program code into the computer system 522 to enable the computer system 522 to manage user object access as a function of metadata specific to the object and to the user ACL entry as described above with respect to FIGS. 1-5. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g., a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing access control list entries as a function of user-specific object access data, the method comprising:

provide to a plurality of users access to a file system, the file system including a plurality of file system objects, each object having, at a level of the file system object, an access control list metadata storage device and an access control list rule storage device, wherein the access control list metadata storage device contains access control list entries that include each of an access control list time metadata entry (atime), an access control list modification time metadata entry (mtime), a duration constraint metadata entry (dtime), a valid time entry metadata entry (vtime) and an access control list access count metadata entry (nuse) for each of the plurality of different users and the object, wherein an access control list entry is only valid for a specific length of time after a first access time that is indicated by the vtime metadata entry, the access control list rule store contains access control rules applicable to the object and a user, and the access control list metadata entries for each object and each user are linked to the corresponding objects and users within the file system;

in response to receiving a request from a requesting user to access a file system object, determine whether the request is authorized for access to the object as a function of the atime and mtime metadata entries for the object and the requesting user;

in response to determining that the request by the user is not authorized for access to the object as the function of the atime and mtime metadata entries for the object and the requesting user, deny access to the object by the requesting user and invalidate the user access control list entry;

in response to determining that the request by the user is authorized for access to the object as the function of the atime and mtime metadata entries for the object and the requesting user, grant access to the object by the user permitting modification of the object, update the date/timestamp field of the access control list atime metadata entry for the object and the requesting user to a date and time of the granting of the request, and increment the nuse metadata entry that is applicable to the requesting user and the requested object; and in response to determining that the requesting user modifies the object in response to the granted access of the object, update the date/timestamp field of the access control list mtime metadata entry for the object and the requesting user to indicate a date and time of the object modification; and wherein the update of the access control list atime or mtime entry date/timestamp fields and the increment of the access control list nuse metadata entry for the object and the user does not overwrite any of the stored plurality of the different atime, mtime or nuse metadata entries that are associated with the object and with another user that is different from the user.

2. The method of claim 1, further comprising:

integrating computer-readable program code into a computer system comprising a processor, a computer readable memory and a computer readable storage device, wherein the computer readable program code is embodied on the computer readable storage device and comprises instructions for execution by the processor via the computer readable memory that cause the processor to perform the steps of providing access to the file system to the plurality of users, determining whether the request is authorized for access to the object as a function of the atime and mtime metadata entries for the object and the requesting user in response to receiving the request, denying access to the object by the requesting user and invalidating the user access control list entry in response to determining that the request by the user is not authorized for access to the object as the function of the atime and mtime metadata entries for the object and the requesting user, granting access to the object by the user and permitting modification of the object and updating the date/timestamp field of the access control list atime metadata entry for the object and the requesting user to a date and time of the granting of the request and incrementing the nuse metadata entry that is applicable to the requesting user and the requested object in response to determining that the request by the user is authorized for access to the object as the function of the atime and mtime metadata entries for the object and the requesting user, and updating the date/timestamp field of the access control list mtime metadata entry for the object and the requesting user to indicate the date and time of the object modification in response to determining that the requesting user modifies the object in response to the granted access of the object.

3. The method of claim 1, wherein the step of processor determining whether the request is authorized for access to the object as the function of the atime and mtime metadata entries for the object and the requesting user in response to receiving the request from the requesting user to access a file system object comprises:

determining whether the date and time of the request falls within a begin date and time of the dtime entry for the requesting user and the requested object and an end date and time of the dtime field for the requesting user and the requested object; and determining whether a first-modification time period is elapsed from a date and time of a first modification of the requested object by the requesting user that is indicated by a validity field within the vtime metadata entry for the requesting user and the requested object, to the date and time of the request.

4. The method of claim 3, wherein the object access request input associated with the specific file system object is at least one of:

a periodic query of the access control list entry metadata for the object and the user by an access control list administrator or owner of the file system object, and the updating of the access control list entry metadata for the object and the user comprises pruning a plurality of access control list entries by invalidating the user access control list entry; and a request by the user to access the object, and the updating of the access control list entry metadata for the object and the user comprises at least one of entering the time and date of the request input in the date/timestamp field of the access control list atime and the mtime metadata entries as the last object access metadata entry, and incrementing the count of accesses of the access control list nuse metadata entry for the object and the user.

5. The method of claim 3, wherein the step of processor determining whether the request is authorized for access to the object as the function of the atime and mtime metadata entries for the object and the requesting user in response to receiving the request from the requesting user to access a file system object comprises:

granting access to the object by the user for modification of the object in response to determining that the date and time of the request falls within a begin date and time of a Begin Date/Time field of the access control list dtime entry for the user and the object, and an end date and time of an End Date/Time field of user access control list dtime entry for the user and the object; and denying access to the object by the user and updating the date/timestamp field of the access control list atime metadata entry for the object and the user to indicate the date and time of the request as the date and time of the denied access, in response to determining that the date and time of the request does not fall within the dates and times of the Begin Date/Time field and the End Date/Time field of the access control list dtime entry for the user and the object.

6. The method of claim 3, wherein the access control list metadata that is applicable to the requesting user and the requested object comprises an inactivity time period metadata entry (itime) for the requesting user that specifies an inactivity time period wherein a permission for access to the object by the requesting user expires upon an elapse of the inactivity time period, wherein the stored access control list metadata entries comprise each of a plurality of different itime entries for the object for each of the plurality of different users that includes the requesting user; and the method further comprising:

determining a last-modification time period elapsed since a date and time of a last modification of the object by the user that is indicated by the mtime metadata entry for the user and the object;

comparing the elapsed last-modification time period to the inactivity time period;

in response to determining that the elapsed last-modification time period is less than the inactivity time period, granting access to the object by the user, and updating the access control list atime and mtime metadata entries for the user and the object to indicate the date and time of the request as a date and time of an access to the object by the user pursuant to the granted access; and in response to determining that the elapsed last-modification time period is not less than the inactivity time period, denying access to the object by the user and updating the access control list atime entry metadata for the object and the user to indicate the date and time of the request as a date and time of the denying the access to the object by the user.

7. The method of claim 3, wherein the step of processor determining whether the request is authorized for access to the object as the function of the atime and mtime metadata entries for the object and the requesting user in response to receiving the request from the requesting user to access a file system object comprises:

comparing the elapsed first-modification time period to a validity time period of an access control list rule that is applicable to the requesting user and the requested object;

in response to determining that the elapsed first-modification time period is less than the validity time period, granting access to the object by the user for modification of the object and updating the access control list atime and mtime metadata entries for the object and the user to indicate the date and time of the request as a date and time of the granted access; and in response to determining that the elapsed first-modification time period is not less than the validity time period, denying access to the object by the user and updating the access control list atime entry metadata for the object and the user to indicate the date and time of the request as a date and time of the denying the access to the object by the user.

8. The method of claim 3, wherein the access control list rule that is applicable to the requesting user and the requested object specifies a threshold number of accesses permitted for the user; and the method further comprising:

comparing the incremented total number of accesses of the object by the user indicated by an access count field within the nuse metadata entry for the object and the requesting user to the specified threshold number of permitted accesses;

in response to determining that the incremented total number of accesses of the object by the user indicated by the access count field within the nuse metadata entry for the requesting user and the object is less than the specified threshold number of permitted accesses, granting access to the object by the user for modification of the object and updating the date/timestamp fields of the access control list atime and mtime metadata entries for the object and the user to indicate the date and time of the request as a date and time of the granted access; and in response to determining that the incremented total number of accesses of the object by the user indicated by the access count field within the nuse metadata entry for the requesting user and the object is not less than the specified threshold number of permitted accesses:

denying access to the object by the user and updating the date/timestamp field of the access control list atime metadata entry for the object and the user to indicate the date and time of the request as a date and time of the denying the access to the object by the user; or granting access to the object by the user for modification of the object and updating the date/timestamp field of the access control list mtime metadata entry for the object and the user with the date and time of the request as a threshold event date and time.

9. A system, comprising:

a processor;

a computer readable memory in circuit communication with the processor; and a computer-readable storage medium in circuit communication with the processor;

wherein the processor executes program instructions stored on the computer-readable storage medium via the computer readable memory and thereby:

provide to a plurality of users access to a file system, the file system including a plurality of file system objects, each object having, at a level of the file system object, an access control list metadata storage device and an access control list rule storage device, wherein the access control list metadata storage device contains access control list entries that include each of an access control list time metadata entry (atime), an access control list modification time metadata entry (mtime), a duration constraint metadata entry (dtime), a valid time entry metadata entry (vtime) and an access control list access count metadata entry (nuse) for each of the plurality of different users and the object, wherein an access control list entry is only valid for a specific length of time after a first access time that is indicated by the vtime metadata entry, the access control list rule store contains access control rules applicable to the object and a user, and the access control list metadata entries for each object and each user are linked to the corresponding objects and users within the file system;

in response to receiving a request from a requesting user to access a file system object, determine whether the request is authorized for access to the object as a function of the atime and mtime metadata entries for the object and the requesting user;

in response to determining that the request by the user is not authorized for access to the object as the function of the atime and mtime metadata entries for the object and the requesting user, deny access to the object by the requesting user and invalidate the user access control list entry;

in response to determining that the request by the user is authorized for access to the object as the function of the atime and mtime metadata entries for the object and the requesting user, grant access to the object by the user permitting modification of the object, update the date/timestamp field of the access control list atime metadata entry for the object and the requesting user to a date and time of the granting of the request, and increment the nuse metadata entry that is applicable to the requesting user and the requested object; and in response to determining that the requesting user modifies the object in response to the granted access of the object, update the date/timestamp field of the access control list mtime metadata entry for the object and the requesting user to indicate a date and time of the object modification; and wherein the update of the access control list atime or mtime entry date/timestamp fields and the increment of the access control list nuse metadata entry for the object and the user does not overwrite any of the stored plurality of the different atime, mtime or nuse metadata entries that are associated with the object and with another user that is different from the user.

10. The system of claim 9, wherein the processor executes the program instructions stored on the computer-readable storage medium via the computer readable memory and thereby determines whether the request is authorized for access to the object as the function of the atime and mtime metadata entries for the object and the requesting user in response to receiving the request from the requesting user to access a file system object by:

determining whether the date and time of the request falls within a begin date and time of the dtime entry for the requesting user and the requested object and an end date and time of the dtime field for the requesting user and the requested object; and determining whether a first-modification time period is elapsed from a date and time of a first modification of the requested object by the requesting user that is indicated by a validity field within the vtime metadata entry for the requesting user and the requested object, to the date and time of the request.

11. The system of claim 9, wherein the processor executes the program instructions stored on the computer-readable storage medium via the computer readable memory and thereby determines whether the request is authorized for access to the object as the function of the atime and mtime metadata entries for the object and the requesting user in response to receiving the request from the requesting user to access a file system object by:

granting access to the object by the user for modification of the object in response to determining that the date and time of the request falls within a begin date and time of a Begin Date/Time field of the access control list dtime entry for the user and the object, and an end date and time of an End Date/Time field of user access control list dtime entry for the user and the object; and denying access to the object by the user and updating the date/timestamp field of the access control list atime metadata entry for the object and the user to indicate the date and time of the request as the date and time of the denied access, in response to determining that the date and time of the request does not fall within the dates and times of the Begin Date/Time field and the End Date/Time field of the access control list dtime entry for the user and the object.

12. The system of claim 9, wherein the access control list metadata that is applicable to the requesting user and the requested object comprises an inactivity time period metadata entry (itime) for the requesting user that specifies an inactivity time period wherein a permission for access to the object by the requesting user expires upon an elapse of the inactivity time period, wherein the stored access control list metadata entries comprise each of a plurality of different itime entries for the object for each of the plurality of different users that includes the requesting user; and wherein the processor executes the program instructions stored on the computer-readable storage medium via the computer readable memory and thereby:

determines a last-modification time period elapsed since a date and time of a last modification of the object by the user that is indicated by the mtime metadata entry for the user and the object;

compares the elapsed last-modification time period to the inactivity time period;

grants access to the object by the user and updates the access control list atime and mtime metadata entries for the user and the object to indicate the date and time of the request as a date and time of an access to the object by the user pursuant to the granted access, in response to determining that the elapsed last-modification time period is less than the inactivity time period; and denies access to the object by the user and updates the access control list atime entry metadata for the object and the user to indicate the date and time of the request as a date and time of denying the access to the object by the user, in response to determining that the elapsed last-modification time period is not less than the inactivity time period.

13. The system of claim 9, wherein the processor executes the program instructions stored on the computer-readable storage medium via the computer readable memory and thereby determines whether the request is authorized for access to the object as the function of the atime and mtime metadata entries for the object and the requesting user in response to receiving the request from the requesting user to access a file system object by:

comparing the elapsed first-modification time period to a validity time period of an access control list rule that is applicable to the requesting user and the requested object;

in response to determining that the elapsed first-modification time period is less than the validity time period, granting access to the object by the user for modification of the object and updating the access control list atime and mtime metadata entries for the object and the user to indicate the date and time of the request as a date and time of the granted access; and in response to determining that the elapsed first-modification time period is not less than the validity time period, denying access to the object by the user and updating the access control list atime entry metadata for the object and the user to indicate the date and time of the request as a date and time of the denying the access to the object by the user.

14. The system of claim 9, wherein the access control list rule that is applicable to the requesting user and the requested object specifies a threshold number of accesses permitted for the user; and wherein the processor executes the program instructions stored on the computer-readable storage medium via the computer readable memory and thereby:

compares the incremented total number of accesses of the object by the user indicated by an access count field within the nuse metadata entry for the object and the requesting user to the specified threshold number of permitted accesses;

in response to determining that the incremented total number of accesses of the object by the user indicated by the access count field within the nuse metadata entry for the requesting user and the object is less than the specified threshold number of permitted accesses, grants access to the object by the user for modification of the object and updates the date/timestamp fields of the access control list atime and mtime metadata entries for the object and the user to indicate the date and time of the request as a date and time of the granted access; and in response to determining that the incremented total number of accesses of the object by the user indicated by the access count field within the nuse metadata entry for the requesting user and the object is not less than the specified threshold number of permitted accesses:

denies access to the object by the user and updates the date/timestamp field of the access control list atime metadata entry for the object and the user to indicate the date and time of the request as a date and time of the denying the access to the object by the user; or grants access to the object by the user for modification of the object and updates the date/timestamp field of the access control list mtime metadata entry for the object and the user with the date and time of the request as a threshold event date and time.

15. An article of manufacture, comprising:

a computer readable storage device having computer readable program code embodied therewith, the computer readable program code comprising instructions for execution by a computer processor that cause the computer processor to:

provide to a plurality of users access to a file system, the file system including a plurality of file system objects, each object having, at a level of the file system object, an access control list metadata storage device and an access control list rule storage device, wherein the access control list metadata storage device contains access control list entries that include each of an access control list time metadata entry (atime), an access control list modification time metadata entry (mtime), a duration constraint metadata entry (dtime), a valid time entry metadata entry (vtime) and an access control list access count metadata entry (nuse) for each of the plurality of different users and the object, wherein an access control list entry is only valid for a specific length of time after a first access time that is indicated by the vtime metadata entry, the access control list rule store contains access control rules applicable to the object and a user, and the access control list metadata entries for each object and each user are linked to the corresponding objects and users within the file system;

in response to receiving a request from a requesting user to access a file system object, determine whether the request is authorized for access to the object as a function of the atime and mtime metadata entries for the object and the requesting user;

in response to determining that the request by the user is not authorized for access to the object as the function of the atime and mtime metadata entries for the object and the requesting user, deny access to the object by the requesting user and invalidate the user access control list entry;

in response to determining that the request by the user is authorized for access to the object as the function of the atime and mtime metadata entries for the object and the requesting user, grant access to the object by the user permitting modification of the object, update the date/timestamp field of the access control list atime metadata entry for the object and the requesting user to a date and time of the granting of the request, and increment the nuse metadata entry that is applicable to the requesting user and the requested object; and in response to determining that the requesting user modifies the object in response to the granted access of the object, update the date/timestamp field of the access control list mtime metadata entry for the object and the requesting user to indicate a date and time of the object modification; and wherein the update of the access control list atime or mtime entry date/timestamp fields and the increment of the access control list nuse metadata entry for the object and the user does not overwrite any of the stored plurality of the different atime, mtime or nuse metadata entries that are associated with the object and with another user that is different from the user.

16. The computer program product of claim 15, wherein the computer readable program code instructions for execution by the processor further cause the processor to determine whether the request is authorized for access to the object as the function of the atime and mtime metadata entries for the object and the requesting user in response to receiving the request from the requesting user to access a file system object by:

determining whether the date and time of the request falls within a begin date and time of the dtime entry for the requesting user and the requested object and an end date and time of the dtime field for the requesting user and the requested object; and determining whether a first-modification time period is elapsed from a date and time of a first modification of the requested object by the requesting user that is indicated by a validity field within the vtime metadata entry for the requesting user and the requested object, to the date and time of the request.

17. The computer program product of claim 16, wherein the computer readable program code instructions for execution by the processor further cause the processor to determine whether the request is authorized for access to the object as the function of the atime and mtime metadata entries for the object and the requesting user in response to receiving the request from the requesting user to access a file system object by:

granting access to the object by the user for modification of the object in response to determining that the date and time of the request falls within a begin date and time of a Begin Date/Time field of the access control list dtime entry for the user and the object, and an end date and time of an End Date/Time field of user access control list dtime entry for the user and the object; and denying access to the object by the user and updating the date/timestamp field of the access control list atime metadata entry for the object and the user to indicate the date and time of the request as the date and time of the denied access, in response to determining that the date and time of the request does not fall within the dates and times of the Begin Date/Time field and the End Date/Time field of the access control list dtime entry for the user and the object.

18. The computer program product of claim 16, wherein the access control list metadata that is applicable to the requesting user and the requested object comprises an inactivity time period metadata entry (itime) for the requesting user that specifies an inactivity time period wherein a permission for access to the object by the requesting user expires upon an elapse of the inactivity time period, wherein the stored access control list metadata entries comprise each of a plurality of different itime entries for the object for each of the plurality of different users that includes the requesting user; and wherein the computer readable program code instructions for execution by the processor further cause the processor to:

determine a last-modification time period elapsed since a date and time of a last modification of the object by the user that is indicated by the mtime metadata entry for the user and the object;

compare the elapsed last-modification time period to the inactivity time period;

grant access to the object by the user and updates the access control list atime and mtime metadata entries for the user and the object to indicate the date and time of the request as a date and time of an access to the object by the user pursuant to the granted access, in response to determining that the elapsed last-modification time period is less than the inactivity time period; and deny access to the object by the user and update the access control list atime entry metadata for the object and the user to indicate the date and time of the request as a date and time of denying the access to the object by the user, in response to determining that the elapsed last-modification time period is not less than the inactivity time period.

19. The computer program product of claim 16, wherein the computer readable program code instructions for execution by the processor further cause the processor to determine whether the request is authorized for access to the object as the function of the atime and mtime metadata entries for the object and the requesting user in response to receiving the request from the requesting user to access a file system object by:

comparing the elapsed first-modification time period to a validity time period of an access control list rule that is applicable to the requesting user and the requested object;

in response to determining that the elapsed first-modification time period is less than the validity time period, granting access to the object by the user for modification of the object and updating the access control list atime and mtime metadata entries for the object and the user to indicate the date and time of the request as a date and time of the granted access; and in response to determining that the elapsed first-modification time period is not less than the validity time period, denying access to the object by the user and updating the access control list atime entry metadata for the object and the user to indicate the date and time of the request as a date and time of the denying the access to the object by the user.

20. The computer program product of claim 16, wherein the access control list rule that is applicable to the requesting user and the requested object specifies a threshold number of accesses permitted for the user; and wherein the computer readable program code instructions for execution by the processor further cause the processor to:

compare the incremented total number of accesses of the object by the user indicated by an access count field within the nuse metadata entry for the object and the requesting user to the specified threshold number of permitted accesses;

in response to determining that the incremented total number of accesses of the object by the user indicated by the access count field within the nuse metadata entry for the requesting user and the object is less than the specified threshold number of permitted accesses, grant access to the object by the user for modification of the object and update the date/timestamp fields of the access control list atime and mtime metadata entries for the object and the user to indicate the date and time of the request as a date and time of the granted access; and in response to determining that the incremented total number of accesses of the object by the user indicated by the access count field within the nuse metadata entry for the requesting user and the object is not less than the specified threshold number of permitted accesses:

deny access to the object by the user and update the date/timestamp field of the access control list atime metadata entry for the object and the user to indicate the date and time of the request as a date and time of the denying the access to the object by the user; or grant access to the object by the user for modification of the object and update the date/timestamp field of the access control list mtime metadata entry for the object and the user with the date and time of the request as a threshold event date and time.

\* \* \* \* \*